(12) United States Patent
Yamamoto et al.

(10) Patent No.: US 8,474,988 B2
(45) Date of Patent: Jul. 2, 2013

(54) PROJECTOR

(75) Inventors: Yusuke Yamamoto, Osaka (JP); Toshihiro Saruwatari, Kishiwada (JP); Chao Wang, Shenzhen (CN)

(73) Assignees: SANYO Electric Co., Ltd., Moriguchi-shi, Osaka (JP); SANYO Technology Center (Shenzhen) Co., Ltd., Shenzhen, Guangdong (CN)

( * ) Notice: Subject to any disclaimer, the term of this patent is extended or adjusted under 35 U.S.C. 154(b) by 136 days.

(21) Appl. No.: 13/242,304

(22) Filed: Sep. 23, 2011

(65) Prior Publication Data

US 2012/0075597 A1 Mar. 29, 2012

(30) Foreign Application Priority Data

Sep. 29, 2010 (JP) ................ 2010-219833

(51) Int. Cl.
*G03B 21/14* (2006.01)
*F16M 11/00* (2006.01)
(52) U.S. Cl.
USPC ............. 353/119; 248/176.1; 248/176.3
(58) Field of Classification Search
USPC ............ 353/119; 248/176.1, 176.3
See application file for complete search history.

(56) References Cited

U.S. PATENT DOCUMENTS

2010/0321646 A1* 12/2010 Nakano et al. ............... 353/119

FOREIGN PATENT DOCUMENTS

| JP | 2000-122180 A | 4/2000 |
| JP | 2008-197389 A | 8/2008 |

* cited by examiner

*Primary Examiner* — Seung C Sohn
(74) *Attorney, Agent, or Firm* — Westerman, Hattori, Daniels & Adrian, LLP

(57) ABSTRACT

A projector to which a ceiling suspension attachment is fixed. The projector accommodates an internal device. The projector is provided with an outer case including a bottom wall that defines an outer bottom surface and an inner bottom surface of the outer case. Insert nuts are arranged on the bottom wall. Each insert nut includes a threaded hole to which a first coupling screw is fastened and a second coupling screw can be fastened. The first coupling screw couples the attachment to the outer bottom surface of the bottom wall, and the second coupling screw is fastened to the threaded hole from a side opposite to the first coupling screw. The second coupling screw is fastened at least one of the insert nuts to couple the inner device to the inner bottom surface of the bottom wall.

6 Claims, 7 Drawing Sheets

PROJECTOR

CROSS-REFERENCE TO RELATED APPLICATIONS

This application is based upon and claims the benefit of priority from prior Japanese Patent Application No. 2010-219833, filed on Sep. 29, 2010, the entire contents of which are incorporated herein by reference.

BACKGROUND OF THE INVENTION

The present invention relates to a projector that enlarges and projects an image with a projection lens onto a projection screen, and more particularly, to a structure for coupling a ceiling suspension attachment to a projector.

A projector is used in a standing state, in which the projector is arranged on, for example, the surface of a table, or a suspended state, in which the projector is suspended from a ceiling.

When using the projector in a standing state, the projector is arranged so that the top surface of its outer case is located at an upper side, and the bottom surface of the outer case is located at a lower side. When the projector is used in the standing state, the top surface and bottom surface of the outer case are normally referred to as the upper surface and the lower surface. Further, the surface of the outer case in which a projection lens is arranged is normally referred to as a front surface. In this specification, a view of the projector taken in the standing state will be used as the frame of reference for the left, right, front, and rear directions.

When using the projector in a suspended state, the projector is arranged so that the top surface of the outer case is located at the lower side and the bottom surface of the outer case is located at the upper side. In this state, an attachment is coupled to the bottom surface of the outer case. The projector is suspended by the attachment from a ceiling. The present invention provides a structure for coupling the attachment to the bottom surface of the outer case.

Figure 6A:
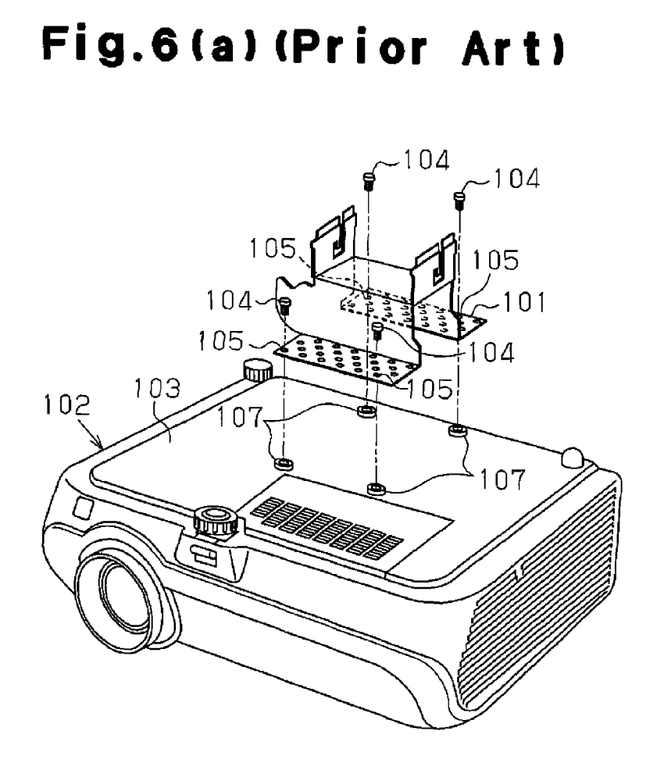
FIG. 6(a) is a perspective view showing a ceiling suspension attachment coupled to a prior art example of a projector.
Figure 6B:
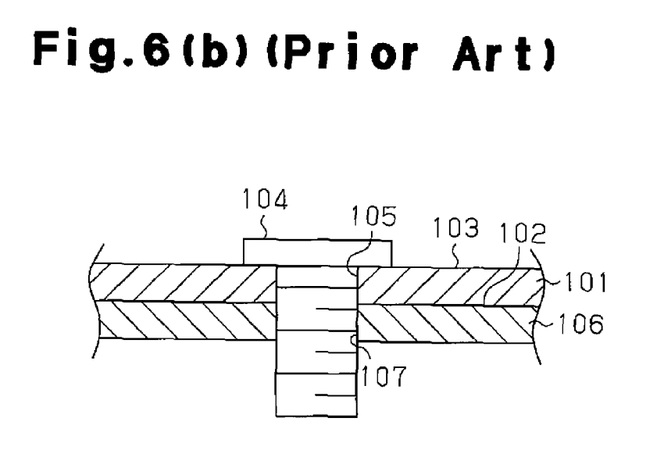
FIG. 6(b) is a schematic cross-sectional view showing a structure for coupling the ceiling suspension attachment.

Japanese Laid-Open Patent Publication No. 2008-197389 describes a prior art example of such a coupling structure, which is shown in FIG. 6.

Referring to FIG. 6(a), an attachment 101, which is used to suspend a projector from a ceiling, is coupled to a bottom surface 103 of the outer case 102. More specifically, referring to FIG. 6(b), a coupling screw 104 is inserted into a hole 105, which extends through the attachment 101, and directly fastened to a threaded hole 107 formed in a bottom wall 106, which defines the bottom surface 103 of the outer case 102. In this manner, the ceiling suspension attachment 101 is coupled to the bottom surface 103 of the case 102.

Figure 7:
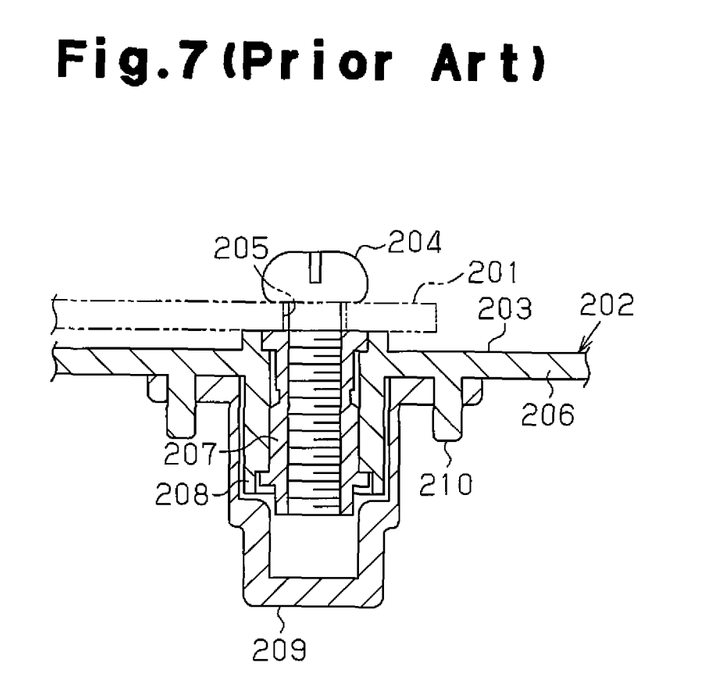
FIG. 7 is a schematic cross-sectional view showing a structure for coupling a ceiling suspension attachment in a further prior art example of a projector.

Japanese Laid-Open Patent Publication No. 2000-122180 describes another example of a coupling structure, which is shown in FIG. 7.

In the same manner as the prior art example described above, a ceiling suspension attachment 201 is coupled to a bottom surface 203 of an outer case 202 of a projector. More specifically, as shown in FIG. 7, a coupling screw 204 is inserted into a hole 205, which extends through the attachment 201, and fastened to a nut 207, which is arranged in a bottom wall 206, which defines the bottom surface 203 of the outer case 202. The nut 207 is fitted to a sleeve 208, which is formed on the bottom wall 206. The nut 207 prevents separation of the coupling screw 204 from the sleeve 208 in the axial direction. A cap 209 covers the sleeve 208 at the inner side of the bottom wall 206. The cap 209 is fixed to projections 210 extending from the inner surface of the bottom wall 206. In this manner, the ceiling suspension attachment 201 is coupled to the bottom surface 203 of the outer case 202.

In Japanese Laid-Open Patent Publication No. 2008-197389, the coupling screw 104, which is for coupling the attachment 101 to the bottom surface 103, is directly fastened to the threaded hole 107, which is formed in the bottom wall 106 of the outer case 102. The threaded hole 107 has low strength, and the coupling screw 104 can easily loosen from the bottom wall 106.

In Japanese Laid-Open Patent Publication No. 2000-122180, the coupling screw 204 is fastened to the nut 207, which is fitted to the bottom wall 206. Thus, the strength of the coupled portion is sufficient. However, the weight of the projector or a force applied to the projector acts greatly on the joint between the nut 207 and the bottom wall 206. Thus, when used over a long period of time, wear or partial breakage of the bottom wall 206 may occur and lower the coupling strength of the nut 207.

SUMMARY OF THE INVENTION

One aspect of the present invention is a projector to which a ceiling suspension attachment is fixed. The projector accommodates an internal device. The projector is provided with an outer case including a bottom wall that defines an outer bottom surface and an inner bottom surface of the outer case. A plurality of insert nuts are arranged on the bottom wall. Each of the insert nuts includes a threaded hole to which a first coupling screw is fastened and a second coupling screw can be fastened. The first coupling screw couples the attachment to the outer bottom surface of the bottom wall, and the second coupling screw is fastened to the threaded hole from a side opposite to the first coupling screw. The second coupling screw is fastened to at least one of the insert nuts to couple the inner device to the inner bottom surface of the bottom wall.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A three-chip LCD projector according to one embodiment of the present invention will now be discussed with reference to the drawings.

In the projector of the present embodiment, the light emitted from a light source lamp is separated into the three primary colors of light, which are red, green, and blue. The light of each separated color is modulated to image information when passing through a liquid crystal light valve. A dichroic mirror combines the modulated light of each color, and a projection lens enlarges the combined light for display. The projector includes a box-shaped outer case 1, which accommodates internal components, such as the light source lamp, an image display unit, a power supply unit, and drive circuits.

Figure 1:
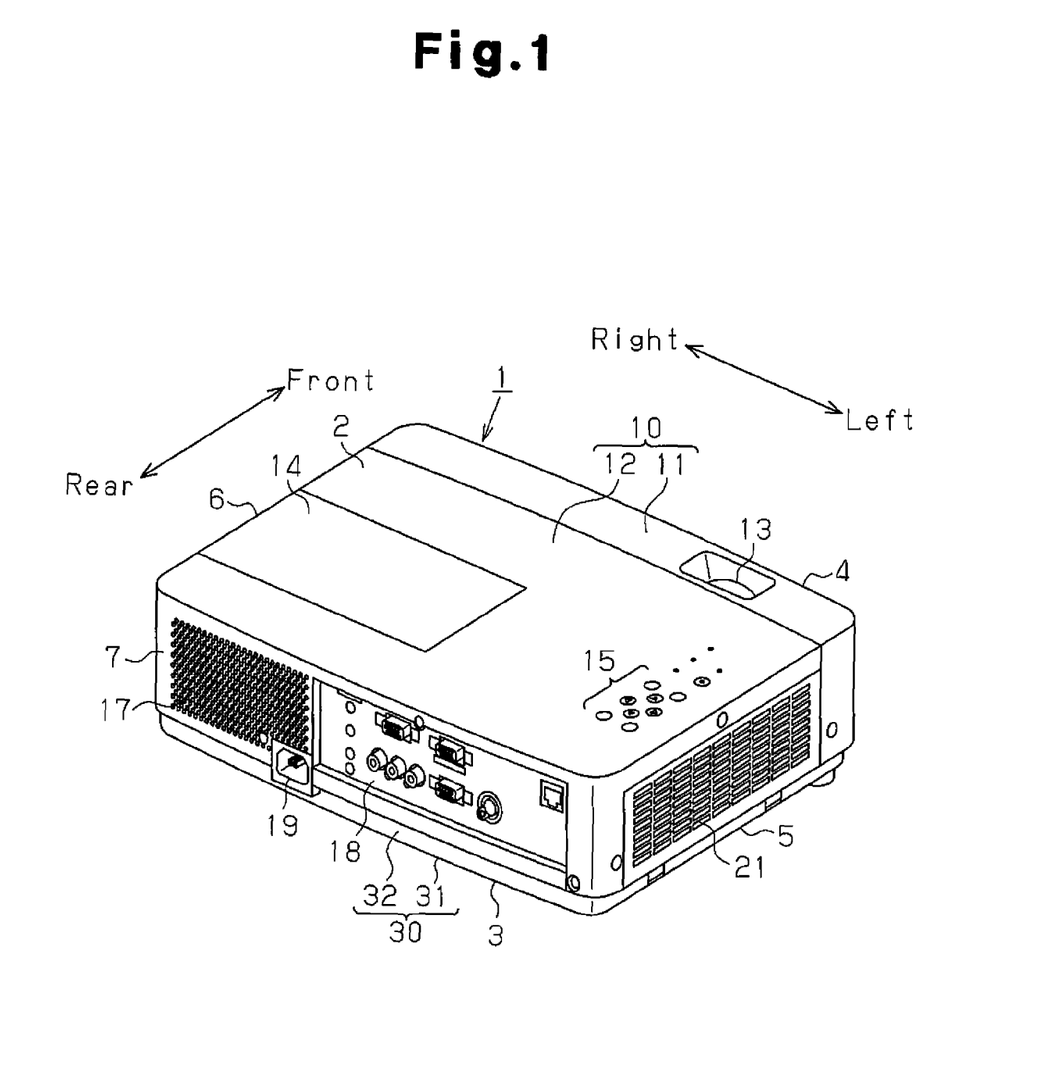
FIG. 1 is a perspective view showing a three-chip LCD projector according to one embodiment of the present invention.

Referring to FIG. 1, when using the projector in a standing state, the outer case 1 is arranged so that its top surface 2 is located at an upper side and its bottom surface 3 is located at a lower side. Further, a front surface 4 that includes a projection lens 13 is arranged to face toward a screen. When used in the standing state, the projector is set at a height that is lower than a central portion of a screen.

The outer case 1 includes an upper case 10, which covers an upper portion of the LCD projector, and a bottom case 30, which covers a lower portion of the LCD projector. The upper case 10 is formed by a front upper case 11 and a rear upper case 12. The front upper case 11 includes the top surface 2, the front surface 4, and front parts of a left surface 5 and a right surface 6. The rear upper case 12 includes a rear surface 7, the top surface 2, and rear parts of the left and right surfaces 5 and 6. The front upper case 11 and rear upper case 12 are fastened by screws to the bottom case 30. The bottom case 30 includes a bottom wall 31, which defines the bottom surface 3, and a relatively low upright wall 32 (refer to FIG. 5), which is joined with the upper case 10 near the bottom wall 31.

The projection lens 13 is arranged in the front surface 4 of the outer case 1 facing a forward direction. A lid 14 used to replace light source lamps is formed in the top surface 2. Switches 15 are also arranged on the top surface to make adjustments in image quality, focus, and the like. A voice generator 17, a connection terminal unit 18, and a power supply unit 19 are arranged in the rear surface 7. An air inlet 21 is formed in the left surface 5.

Figure 2:
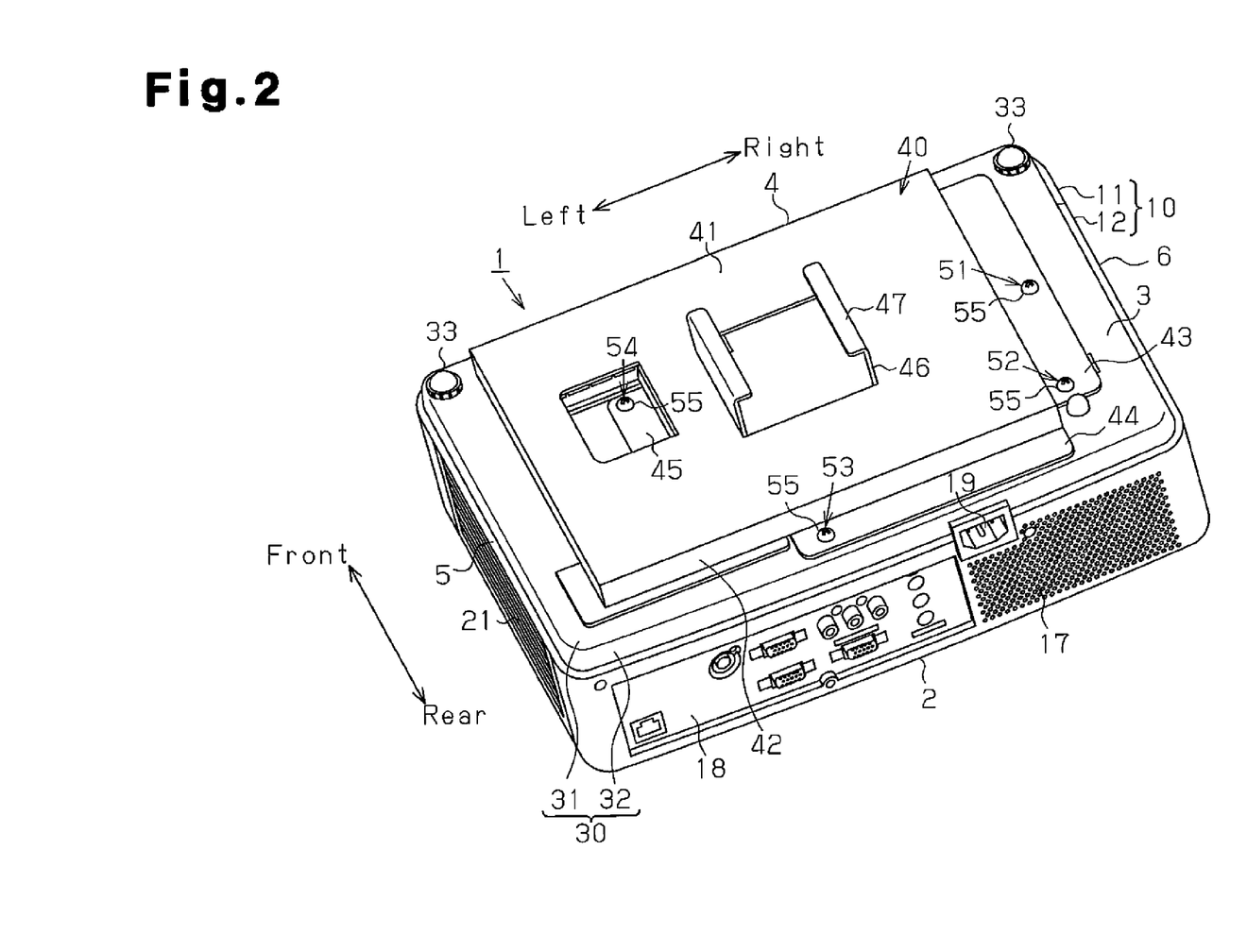
FIG. 2 is a perspective view showing the projector of FIG. 1 in a state in which a bottom surface of the projector is located at the upper side and a ceiling suspension attachment is coupled to the bottom surface.

When suspending the projector from a ceiling, as shown in FIG. 2, the bottom surface 3 of the bottom case 30 is arranged facing an upward direction, and a ceiling suspension attachment 40 is coupled to the bottom surface 3. The front part of the bottom surface 3 includes legs 33, which are used for height adjustment when setting the projector.

Figure 3:
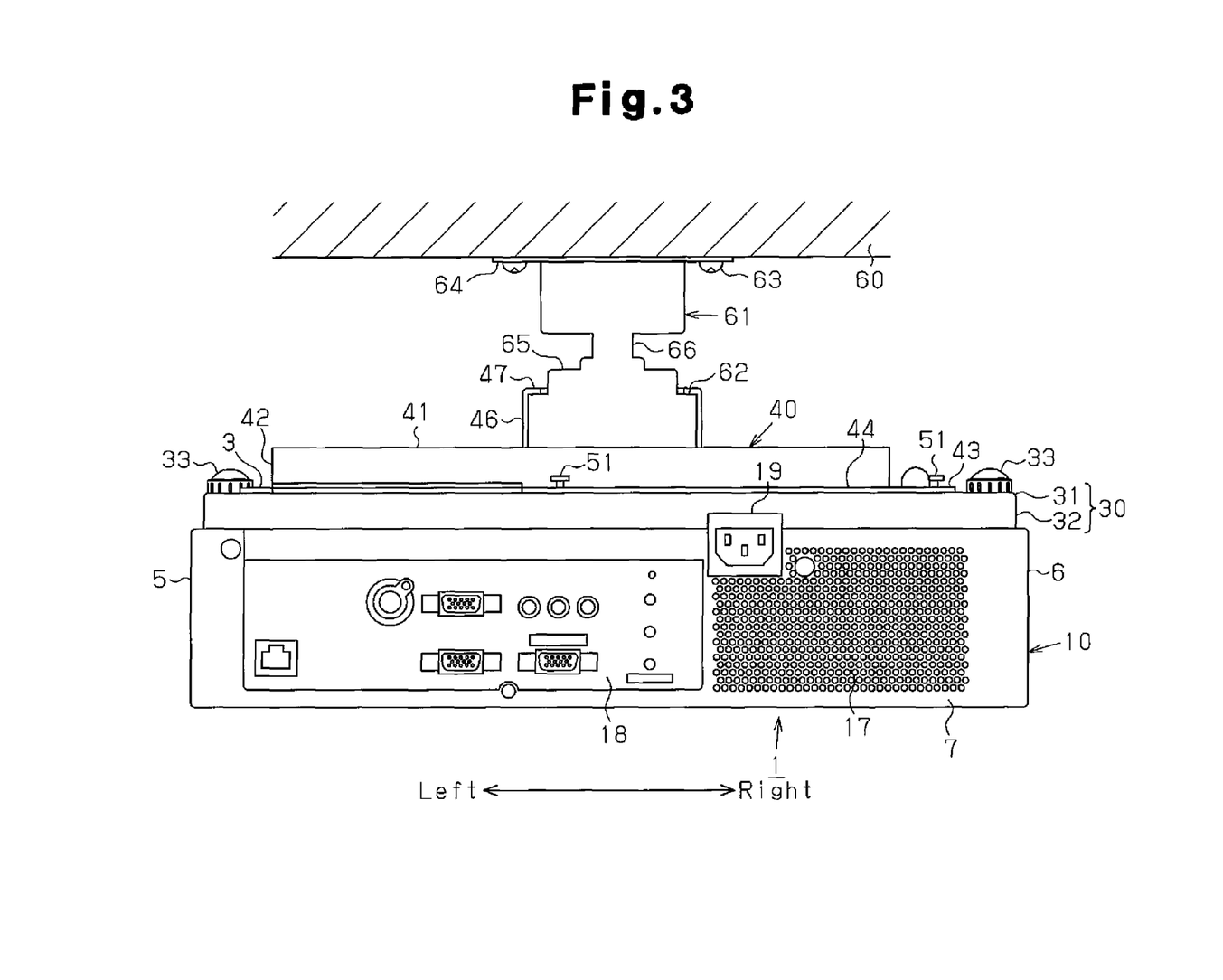
FIG. 3 is a schematic rear view showing the projector of FIG. 1 in a state suspended from a ceiling.

Referring to FIGS. 2 and 3, the attachment 40, includes a flat plate 41, an upright wall 42, and coupling pieces 43 and 44. The flat plate 41 is tetragonal and one step higher than the bottom surface. The upright wall 42 extends around the flat plate 41 in the vertical direction. The coupling pieces 43 and 44 extend continuously sideward and rearward from the upright wall 42. A central coupling piece 45, which is bent downward, is arranged between a central part and left side surface of the flat plate 41. Two upright walls 46 are arranged in the central part of the flat plate 41. A horizontal portion 47 is formed on the upper end of each upright wall 46.

As shown in FIG. 3, a ceiling mount 61 is coupled to a ceiling 60. The ceiling mount 61 includes slide surfaces 62, which are engaged with the horizontal portions 47 of the attachment 40 so that the horizontal portions 47 can slide in forward and rearward directions. The ceiling mount 61 is formed integrally from a resin. The ceiling mount 61 includes a coupling piece 64, which is fixed by fastening screws 63 to the ceiling 60, and a main body 65, which has a narrow middle portion with respect to the heightwise direction that defines a neck 66. The slide surfaces 62 are formed at the neck 66 of the main body 65.

The ceiling suspension attachment 40 is coupled by four coupling screws 55 to the bottom surface 3. Two coupling screws 55 are arranged on the right coupling piece 43, and one coupling screw 55 is arranged on the rear coupling piece 44. Further, one coupling screw 55 is arranged on the central coupling piece 45. The locations of the coupling screws 55 from the right surface 6 to the left surface 5 are referred to as a first fastening portion 51, a second fastening portion 52, a third fastening portion 53, and a fourth fastening portion 54.

Among the four fastening portions, the structure of the first fastening portion 51 most characterizes the features of the present invention and will now be described in detail with reference to FIG. 4.

Figure 4:
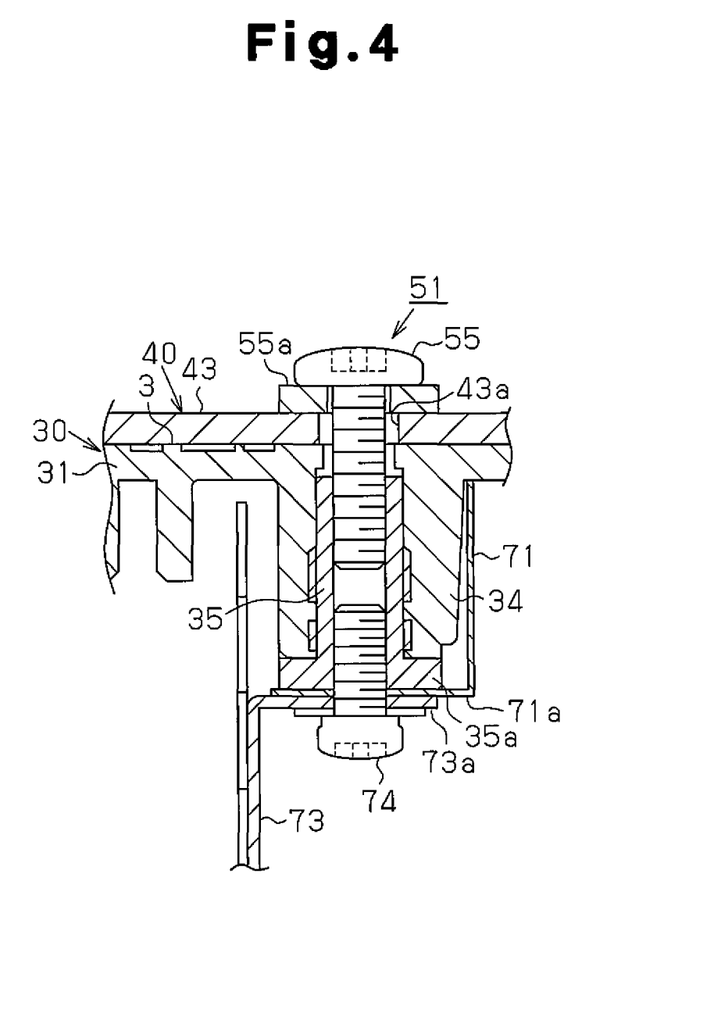
FIG. 4 is a schematic cross-sectional view showing a structure for coupling the ceiling suspension attachment to the projector of FIG. 1.

As shown in FIG. 4, a sleeve 34 is formed on the bottom wall 31, which forms the bottom surface 3. An insert nut 35 is arranged in the sleeve 34. The inner wall of the insert nut 35 is threaded. A projection extends from a circumferential surface of the insert nut 35 to prevent separation and restrict rotation of the insert nut 35. A flange 35a extends from an inner end of the insert nut 35. The flange 35a is arranged in contact with an end face of the sleeve 34.

Figure 5:
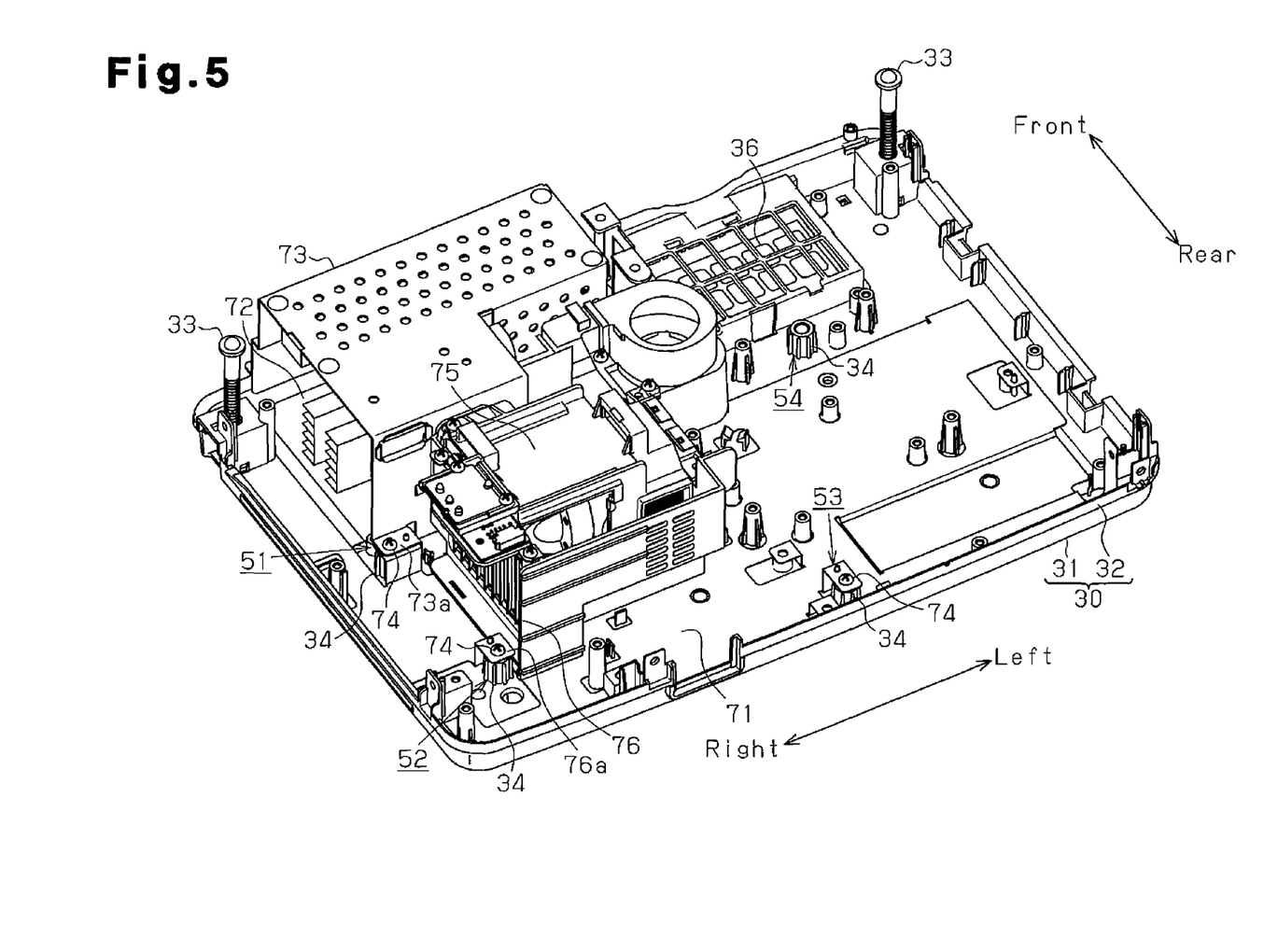
FIG. 5 is a perspective view showing the interior of the projector of FIG. 1 in a state in which an upper case and optical components are removed.

At the first fastening portion 51, the coupling piece 43 of the attachment 40 is arranged in contact with the bottom surface 3. A coupling screw 55 is inserted through a fastening hole 43a, which extends through the coupling piece 43, and fastened at the first fastening portion 51. A washer 55a is arranged between the coupling screw 55 and the coupling piece 43. A bottom shield 71, which is an electromagnetic wave shield plate extending along the bottom wall 31, includes a coupling plate 71a arranged on the flange 35a inside the outer case 1. A power shield 73, which is a shield plate for a power supply unit 72, includes a coupling plate 73a arranged in contact with the lower side (inner side) of the bottom shield 71 as viewed in FIG. 4. The coupling plates 71a and 73a are both fastened by a coupling screw 74 to the insert nut 35. As shown in FIG. 5, the power supply unit 72 is arranged in the outer case 1 near the right surface 6 and the front surface 4 and encompassed by the power shield 73.

The second fastening portion 52 has substantially the same structure as the first fastening portion 51. In the second fastening portion 52, the power shield 73 of the first fastening portion 51 is replaced by a lamp shield 76, which functions as an electromagnetic wave shield. The lamp shield 76 includes a coupling plate 76a arranged rightward from a light source lamp unit 75. The coupling plate 76a is fastened by a coupling screw 74 to the bottom case 30. The light source lamp unit 75 is arranged rearward from the power supply unit 72 in the outer case, as shown in FIG. 5.

Although not shown in detail, the third fastening portion 53 is arranged near the middle portion of the bottom surface 3. At the third fastening portion 53, only the bottom shield 71, which serves as an internal device, is coupled to the bottom case 30 in the outer case 1. Other internal devices are not coupled at the third fastening portion 53.

Although not shown in detail, the fourth fastening portion 54 is arranged rearward from an air inlet 36, which is arranged slightly leftward from the front middle part of the bottom wall 31. There are no internal devices coupled to the bottom case 30 in the outer case 1 at the fourth fastening portion 54. In this respect, the structure of the fourth fastening portion 54 is the same as the structure described in the aforementioned Japanese Laid-Open Patent Publication No. 2000-122180.

In the present embodiment, the ceiling suspension attachment 40 is fastened to the bottom surface 3 of the outer case 1 by the coupling screws 55 at four locations, namely, the first to fourth fastening portions 51 to 54. At three of the locations, namely, the first to third fastening portions 51 to 53, the bottom shield 71, which is one of the internal devices, is coupled by the coupling screws 74 inside the outer case 1. At each of the first fastening portion 51 and the second fastening portion 52, the internal device arranged inside the bottom shield 71, namely, the lamp shield 76, is coupled by the coupling screw 74 to the insert nut 35.

The internal devices are coupled to the first to third fastening portions 51 to 53 in this manner when coupled inside the outer case 1. Accordingly, when coupling the attachment 40 to the outer case 1, the ceiling suspension attachment 40, the internal devices, the insert nuts 35, and the bottom wall 31 are fixed integrally with one another. As a result, the weight of the projector and an external force applied to the attachment 40 do not greatly act on the portion at which the insert nut 35 and the bottom wall 31 are joined with each other. This prevents wear or partial breakage of the bottom wall 31 near the insert nut 35 and increases the strength at the portions at which the coupling screws 55 are coupled.

The projector of the above embodiment has the advantages described below.

x(1) The coupling screws 55 and coupling screws 74 are fastened to the insert nuts 35. The coupling screws 55 couple the ceiling suspension attachment 40 to the projector of the outer case 1 from the outer side. The coupling screws 74 couple the internal devices to the outer case 1 from the inner side. Thus, at the portions at which the coupling screws 55 are coupled, the ceiling suspension attachment 40, the corresponding internal device, the insert nut 35, and the bottom wall 31 are fixed integrally with one another. As a result, the weight of the projector and an external force applied to the attachment 40 do not greatly act on the portion at which the insert nut 35 and the bottom wall 31 are joined with each other. This prevents wear or partial breakage of the bottom wall 31 near the insert nut 35 and increases the strength at the portions at which the coupling screws 55 are coupled.

x(2) The insert nut 35, to which the ceiling suspension attachment 40 is coupled, is used to couple a corresponding internal device. Thus, there is no need to provide a separate threaded hole to couple the internal device. This reduces costs.

x(3) When the bottom shield 71, which is arranged in the outer case 1 facing the bottom wall 31, is coupled to the insert nut 35 as an internal device coupled to the inner side of the outer case 1, inner devices that are coupled to the insert nut can easily be selected.

x(4) Further, internal devices other than the bottom shield 71 are included. Thus, the bottom shield 71 and a further internal device arranged at the inner side of the bottom shield 71 are fastened together to the insert nut 35 by the coupling screw 74. This eliminates the need for a coupling screw and threaded hole used to couple the further internal device and reduces costs.

x(5) Some of the insert nuts 35 are fastened with the coupling screws 55, which couple the ceiling suspension attachment 40 to the bottom wall 31 from the outer side of the outer case 1, and the coupling screws 74, which fix the bottom shield 71 to the bottom wall 31 from the inner side the outer case 1. The other insert nuts 35 are fastened to the coupling screws 55, which couple the ceiling suspension attachment 40 to the bottom wall 31 from the outer side of the outer case 1, and the coupling screws 74, which fix the bottom shield 71 and another internal shield, namely, the lamp shield 76, from the inner side of the outer case 1. This allows for the same coupling screw 74 to fasten internal devices together as long as they are located at the same location. Accordingly, the number of required components, such as threaded holes, can be reduced.

x(6) The insert nuts 35 are coupled to the sleeves 34, which are formed in the bottom wall 31. This increases the area of the bottom wall 31 with which the outer surface of each insert nut 35 is in contact. Thus, the coupling strength of the insert nut 35 is increased. Further, the insert nuts 35 and the sleeves 34 generally have the same length. This facilitates fastening of the coupling screws 55 and 74 from opposite sides.

x(7) The inner end of each insert nut 35 includes the flange 35a, which contacts the inner end face of the corresponding sleeve 34. Thus, the flange 35a supports the weight of the projector and reduces the force that acts on the portion at which the insert nut 35 and the sleeve 34 are joined with each other.

It should be apparent to those skilled in the art that the present invention may be embodied in many other specific forms without departing from the spirit or scope of the invention. Particularly, it should be understood that the present invention may be embodied in the following forms.

In the above embodiment, the internal devices coupled to the insert nut 35 inside the outer case 1 are not limited to the bottom shield 71 and the lamp shield 76 and may be other types of shields. For example, a component such as a speaker or a control substrate may be fastened solely or with other components to the insert nut 35.

The quantity and location of the coupling screws 55 of the ceiling suspension attachment 40 is not limited to those of the above embodiment. For example, the quantity may be five or more. Further, when combined with another fastener, the quantity may be three or less.

In the above embodiment, an internal device is coupled to the coupling portion of some of the coupling screws 55 from the inner side of the outer case. However, the bottom shield 71 may be fixed to the coupling portion of every coupling screw 55.

Although two internal devices are fastened together in the above description, three or more internal devices may be fastened together.

An internal device may be coupled to the insert nut 35 for the coupling portion of every one of the coupling screws 55. Further, two or more internal devices may be fastened together to the insert nut for the coupling portion of every one of the coupling screws 55.

The projector according to the present invention may be used as an image display system for various types of facilities, such as a home theater, a conference room, a training room, a classroom, an amusement hall, an exhibition room, and a studio.

The present examples and embodiments are to be considered as illustrative and not restrictive, and the invention is not to be limited to the details given herein, but may be modified within the scope and equivalence of the appended claims.

The invention claimed is:
1. A projector to which a ceiling suspension attachment is fixed, wherein the projector accommodates an internal device, the projector comprising:
an outer case including a bottom wall that defines an outer bottom surface and an inner bottom surface of the outer case;

a plurality of insert nuts arranged on the bottom wall, wherein each of the insert nuts includes a threaded hole to which a first coupling screw is fastened and a second coupling screw can be fastened, the first coupling screw couples the attachment to the outer bottom surface of the bottom wall, and the second coupling screw is fastened to the threaded hole from a side opposite to the first coupling screw, wherein the second coupling screw is fastened to at least one of the insert nuts to couple the inner device to the inner bottom surface of the bottom wall.

2. The projector according to claim 1, wherein the internal device includes a shield plate coupled to the inner bottom surface of the bottom wall.

3. The projector according to claim 2, wherein
the internal device further includes an internal component arranged in the outer case, and
the shield plate and the internal component are both fastened by the same second coupling screw to the at least one of the insert nuts.

4. The projector according to claim 2, wherein
the internal component includes a power supply unit, and
the shield plate includes an electromagnetic wave shield plate and a power supply unit shield plate.

5. The projector according to claim 3, wherein
the at least one of the insert nuts is fastened with the first coupling screw to couple the ceiling suspension attachment to the outer bottom surface of the bottom wall and the second coupling screw to fix the shield plate to the inner bottom surface of the bottom wall, and
a further one of the insert nuts is fastened with the first coupling screw to couple the ceiling suspension attachment to the outer bottom surface of the bottom wall and the second coupling screw to couple the shield plate and the internal component to the inner bottom surface of the bottom wall.

6. The projector according to claim 1, wherein
the bottom wall includes a plurality of sleeves respectively receiving the insert nuts,
each of the insert nuts includes an end portion, which extends outward from a distal end of the corresponding sleeve when the insert nut is received in the sleeve, and a flange, which is formed integrally with the end portion and adjacent to the distal end of the sleeve, and
when the internal device is coupled to the insert nuts facing the inner bottom surface of the bottom wall, the flange of each of the insert nuts is arranged between the distal end of the corresponding sleeve and the internal device.

* * * * *